United States Patent [19]

Takahashi

[11] Patent Number: 4,519,411
[45] Date of Patent: May 28, 1985

[54] EMERGENCY DISCONNECTOR FOR FLUID LOADING AND UNLOADING LINES

[75] Inventor: Susumu Takahashi, Niigata, Japan
[73] Assignee: Niigata Engineering Co., Ltd., Japan
[21] Appl. No.: 473,409
[22] Filed: Mar. 9, 1983
[30] Foreign Application Priority Data Oct. 20, 1982 [JP] Japan .................. 57-182700

[51] Int. Cl.³ ............................. F16L 37/08
[52] U.S. Cl. .................. 137/68 R; 137/219; 137/614
[58] Field of Search ............. 137/68 R, 614, 614.06, 137/614.11, 219

[56] References Cited

U.S. PATENT DOCUMENTS

| 2,416,787 | 3/1947 | White | 137/219 |
|---|---|---|---|
| 3,916,929 | 11/1975 | Brown | 137/68 R |
| 4,036,257 | 7/1977 | Hanson et al. | 137/614.06 |
| 4,089,341 | 5/1979 | Okaya | 137/614 X |
| 4,309,049 | 1/1982 | Chevallier | 285/365 X |

FOREIGN PATENT DOCUMENTS 2717135 10/1978 Fed. Rep. of Germany ................ 137/614.06

Primary Examiner—Martin P. Schwadron
Assistant Examiner—Stephen M. Hepperle
Attorney, Agent, or Firm—Sughrue, Mion, Zinn, Macpeak, and Seas

[57] ABSTRACT

A fluid transport line for conveying a dangerous fluid such as LNG is provided with an emergency disconnector which severs the line in an emergency situation after cutting off the flow of fluid therein. The cutoff system includes a pair of seal pistons urged toward one another to cut off the fluid passageway while allowing fluid trapped between the pistons to escape back into the line, and an external clamp mechanism which allows the line to be separated after the fluid flow has been cut off.

11 Claims, 6 Drawing Figures

EMERGENCY DISCONNECTOR FOR FLUID LOADING AND UNLOADING LINES

BACKGROUND OF THE INVENTION

The present invention relates to an emergency disconnector for disconnecting a fluid loading and unloading line in an emergency to cut off the flow of a fluid passing therethrough.

Fluid loading and unloading lines are used in such applications as for unloading LNG from an LNG tanker situated alongside a sea berth to a storage tank, or for loading LNG from the storage tank to the LNG tanker.

Under rough weather conditions, the LNG tanker tends to come off of the sea berth due to strong winds or high waves while loading or unloading LNG. In such an emergency, it is necessary that the couplings in the fluid loading and unloading line be disconnected, to sever the loader/unloader on the sea berth from the LNG tanker and to cut off the flow of dangerous LNG against unwanted leakage. To meet such requirements, the fluid loading and unloading line generally includes an emergency line disconnector for disconnecting the line in an emergency situation to quickly stop the fluid flow.

Conventional emergency line disconnectors have suffered from the following shortcomings:

(1) Since fluid flow is cut off after the fluid loading and unloading line has been disconnected, the leakage of a considerable amount of fluid is unavoidable before the fluid flow is cut off; and (2) Designing the disconnector so as to shorten the cutoff time in order to reduce fluid leakage results in an impact such as water hammer being imposed on the fluid loading and unloading line due to quick fluid cutoff.

SUMMARY OF THE INVENTION

The present invention has been made with a view toward the foregoing problems, and it is accordingly an object of the present invention to provide an emergency disconnector for fluid loading and unloading lines which is capable of cutting off the fluid being conveyed without imposing an impact such as water hammer prior to disconnecting the line, and which is thereafter capable of disconnecting the line so that there will be no dangerous external leakage of fluid at the time of line disconnection.

The above object can be achieved by an emergency disconnector according to the present invention, which includes a pair of seal pistons respectively mounted in couplings of the line, which are slidable in opposite directions axially of the couplings under the pressure of a working fluid until the seal pistons are brought into mutual abutment to cut off the fluid passage. The seal pistons are capable of allowing a fluid, which is a portion of the fluid being transported and sealed between the seal pistons when cutting off the passage, to escape into lower-pressure fluid. The pistons also seal the fluid being transported within the couplings. A clamp cylinder is made actuatable under the operating pressure of a working fluid supplied from an actuator system which also supplies the working fluid to said seal pistons, the operating pressure being higher than that for said seal pistons. In an emergency, an external clamp mechanism releases clamp from said couplings to separate the latter from one another in response to the closing off of said couplings by said seal pistons, respectively and subsequent actuation of said clamp cylinder.

DETAILED DESCRIPTION OF THE PREFERRED EMBODIMENTS

The present invention will now be described hereinbelow with reference to an illustrated embodiment thereof.

Figure 1:
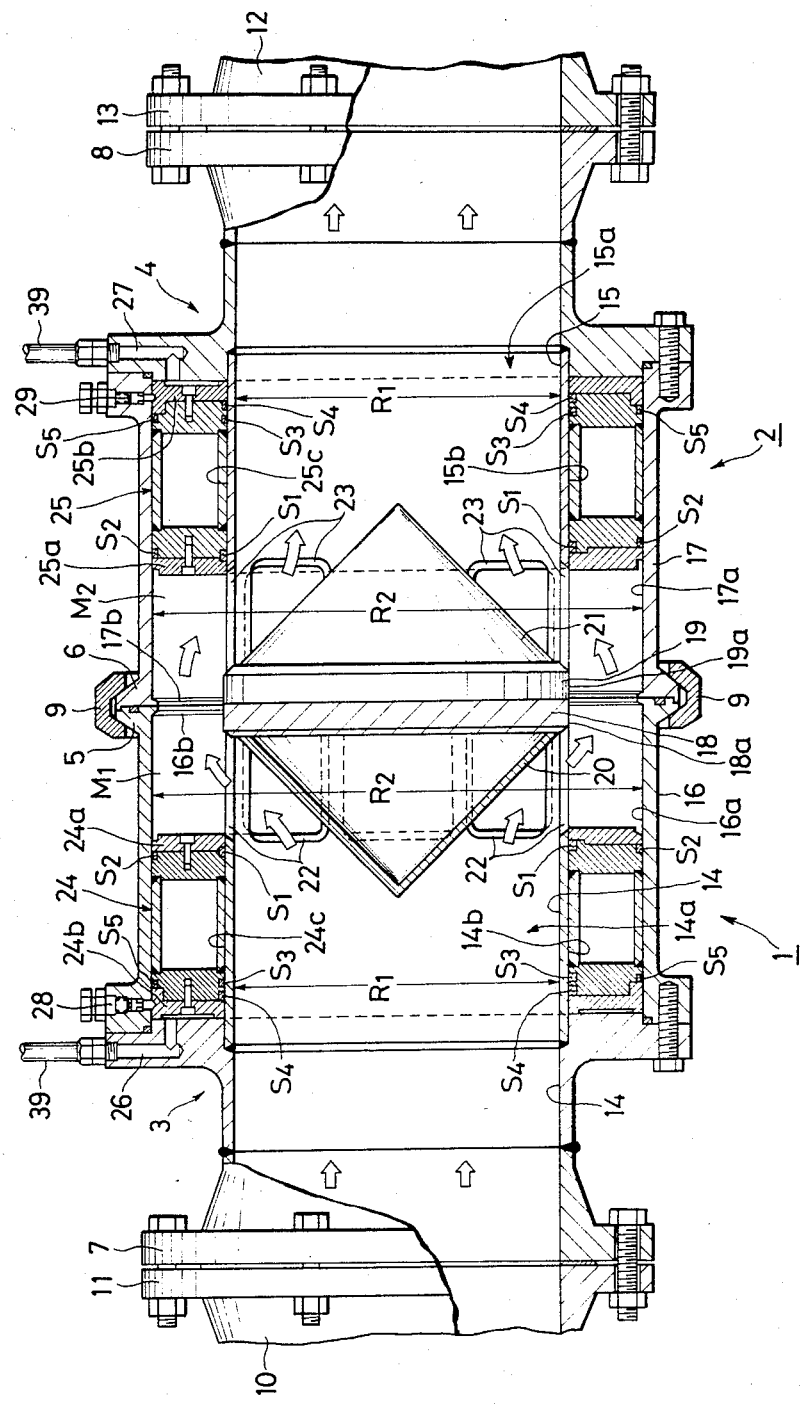
FIG. 1 is a cross-sectional view of an emergency disconnector, as assembled according to the present invention, for a fluid loading and unloading line.
Figure 2:
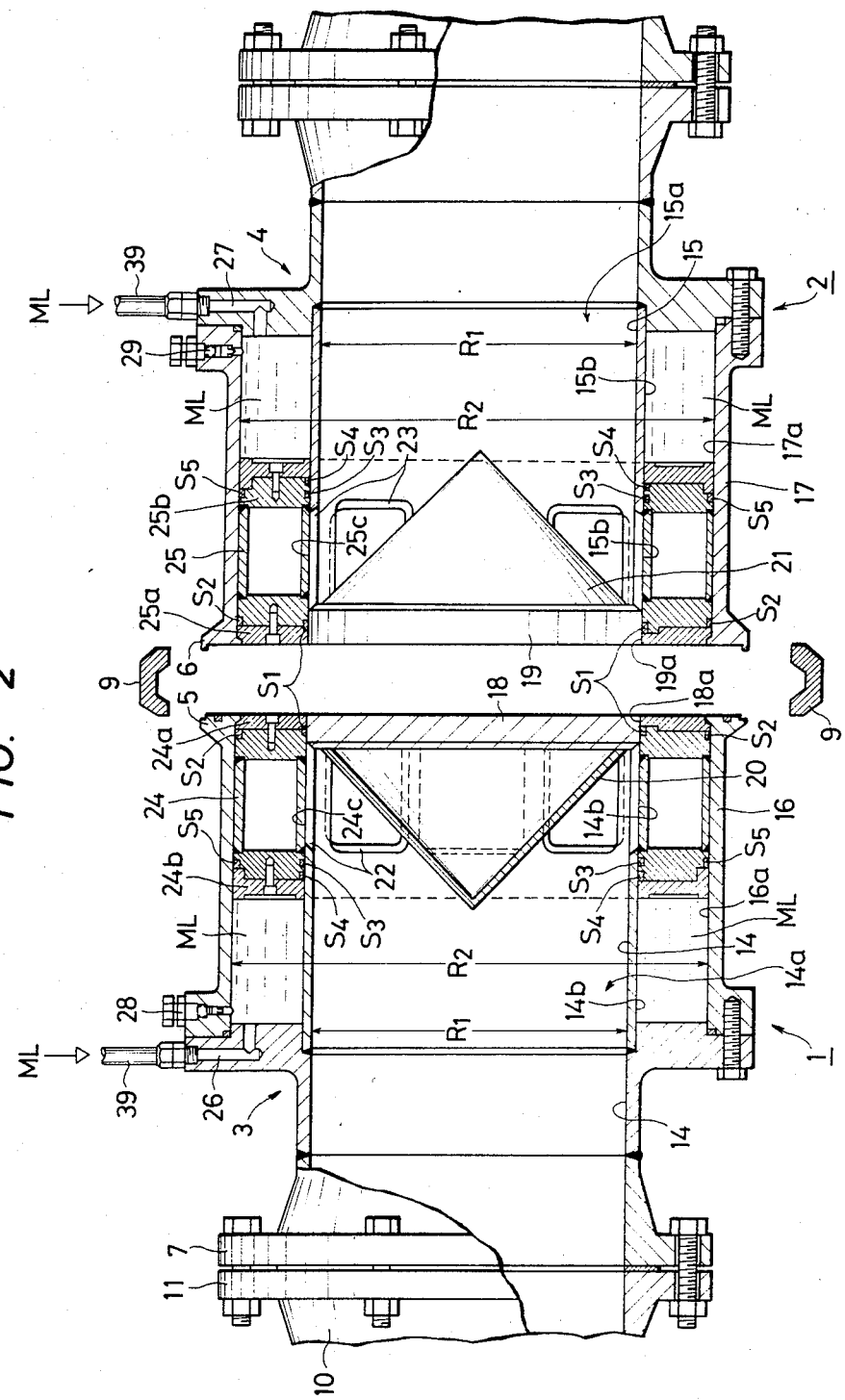
FIG. 2 is a cross-sectional view of the emergency disconnector as separated.

FIGS. 1 and 2 show, in axial cross section, an emergency disconnector for fluid loading and unloading lines according to the present invention. The emergency disconnector comprises a pair of couplings 1, 2 having an identical cylindrical shape. The couplings 1, 2 have barrels 3, 4, respectively, including at opposite ends thereof a pair of mating flanges 5, 6, respectively, and a pair of joint flanges 7, 8, respectively. The mating flanges 5, 6 are joined together by a clamp 9 as shown in FIG. 1.

The joint flange 7 of the coupling 1 is bolted to a joint flange 11 of a connector pipe 10 projecting from the side of a tanker (not shown). The joint flange 8 of the coupling 2 is bolted to a joint flange 13 of a transport pipe 12 of a loading arm (not shown) which constitutes a part of a fluid loading and unloading line. The transport pipe 12 is coupled to a storage tank (not shown). The loading arm is capable of moving and freely positioning the coupling 2 in x, y and z directions into axial alignment with the coupling 1.

The barrels 3, 4 have passage walls 14, 15, respectively, each of a uniform circular cross section having an inside diameter R1 and providing fluid passages 14a, 15a, respectively. The barrels 3, 4 also have tubular outer walls 16, 17, each of an inside diameter R2, extending coaxially around the passage walls 14, 15. The fluid passages 14a, 15a are closed off by closure plates 18, 19, respectively, at the mating flanges 5, 6. A pair of cone elements 20, 21 are attached to the closure plates 18, 19 at their inner sides with the tips of the cones being respectively directed toward the joint flanges 7, 8. The passage walls 14, 15 have passage openings 22, 23 defined therein close to the cones 20, 21 and angularly spaced at equal intervals fully around the peripheries of the passage walls 14, 15. The outer walls 16, 17 and the passage walls 14, 15 jointly define therebetween spaces of ring-shaped cross section which serve as slide spaces M1, M2 allowing seal pistons 24, 25, respectively, to slide axially of the couplings 1, 2. The slide spaces M1, M2, and the fluid passages 14a, 15a are held in communication with each other through the openings 22, 23.

The seal pistons 24, 25 inserted in the slide spaces M1, M2 are each in the form of a ring. The seal pistons 24, 25 have on their front ends abutment members 24a, 25a, respectively, that can be held against stoppers 16b, 17b formed fully around the inner peripheries of the distal ends of the outer walls 16, 17. The seal pistons 24, 25 also have on their rear ends abutment members 24b, 25b, respectively, which are subjected to a pressure by a working fluid ML as described later.

Figure 4:
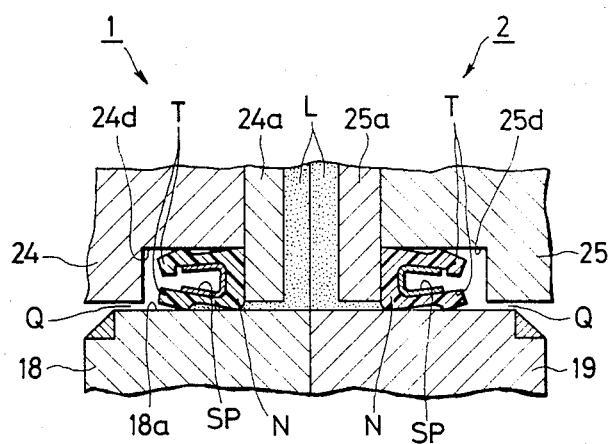
FIG. 4 is a cross-sectional view of a fluid sealed between seal pistons and surrounding parts.

Seals S1, S2 are attached to the seal pistons 24, 25 near the abutment members 24a, 25a, and seals S3, S4, S5 are attached to the seal pistons 24, 25 near the abutment members 24b, 25b. The seals S1, S3, S4 are each in the form of a ring kept in intimate contact with outer peripheral surfaces 14b, 15b of the passage walls 14, 15 and outer peripheral surfaces 18a, 19a of the closure plates 18, 19. Likewise, the seals S2, S5 are each in the form of a ring intimately contacting inner peripheral surfaces 16a, 17a of the outer walls 16, 17. As illustrated in FIG. 4, each of the seals S1 comprises a spring SP of U-shaped cross section and a packing N having a pair of intimately contacting projections T, T and mounted on the spring SP. The seals S1 are disposed respectively in attachment slots 24d, 25d in the seal pistons 24, 25 with the contacting projections T, T being oriented toward the joint flanges 7, 8.

Inner peripheral surfaces 24c, 25c of the seal pistons 24, 25 and the outer peripheral surfaces 18a, 19a of the closure plates 18, 19 define therebetween sealed-fluid escape gaps or clearances Q for allowing a sealed fluid L between the mutually abutting seal pistons 24, 25 to escape into lower-pressure spaces, that is, the fluid passages 14a, 15a when the seal pistons 24, 25 are slid into abutment against the stoppers 16b, 17b, respectively, for cutting off the fluid flow. The gaps Q are sealed off by the intimately contacting projections T of the seals S1.

When the fluid flow is to be cut off, the contacting projections T of the seals S1 are effective in preventing the fluid in the fluid passages 14a, 15a from leaking out of the couplings 1, 2. Instead, the sealed fluid L under high pressure lifts the intimately contacting projections T upwardly (as shown in FIG. 4) against the resiliency of the springs sp so that the sealed fluid L is allowed to return into the fluid passages 14a, 15a. Accordingly, the seals S1 are urged to closely contact the coupling elements in response to fluid pressure from the fluid passages.

The barrels 3, 4 have pressurization ports 26, 27, respectively, closer than the mating flanges to the joint flanges 7, 8 for introducing the working fluid ML (such as oil) for operating seal pistons into the slide spaces M1, M2.

When the emergency disconnector is assembled as shown in FIG. 1 to allow the passage of fluid therethrough under normal conditions, the seal pistons 24, 25 are displaced away from the passage openings 22, 23 toward the pressurization ports 26, 27 to thereby keep the passage openings 22, 23 wide open. At this time, the seal pistons 24, 25 are restrained in a predetermined position by slide stoppers 28, 29, respectively, with a force large enough only to prevent them from falling or sliding in axial directions of the couplings 1, 2. When the seal pistons 24, 25 are caused to slide axially and abut against the stoppers 16b, 17b, the seals S1, S3 act to seal off the loading/unloading fluid, and the seals S4, S5 seal off the working fluid ML.

Figure 3:
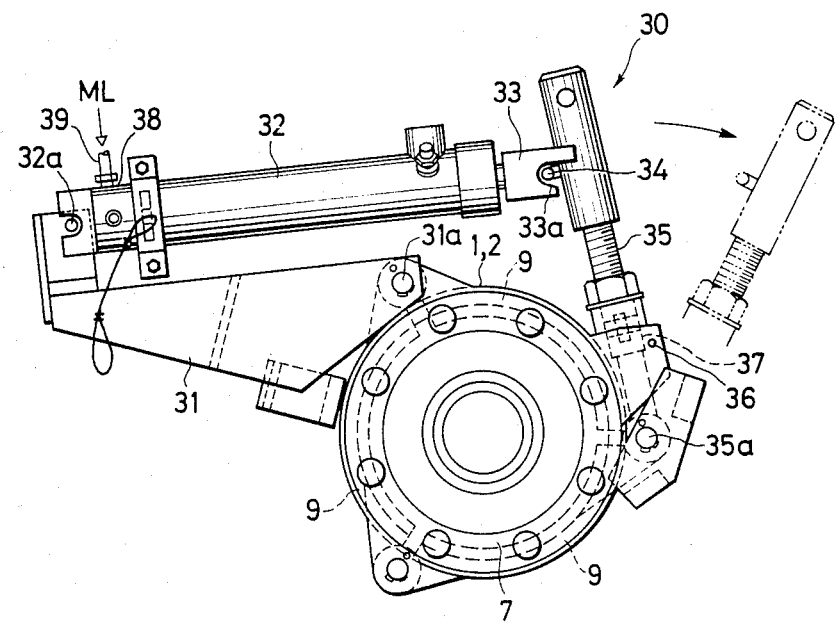
FIG. 3 is a plan view of an external clamp mechanism of the emergency disconnector.

FIG. 3 is illustrative of an external clamp mechanism 30 for removing the clamp 9 from the mating flanges 5, 6 to separate the couplings 1, 2 in an emergency.

The external clamp mechanism 30 comprises a bracket 31 mounted by a hinge pin 31a on the coupling 1, a clamp cylinder 32 having one end attached by a hinge pin 32a to the bracket 31 and including a piston rod having a freely rotatable end, a fork-shaped engagement member 33 fixed to the end of the piston rod of the clamp cylinder 32, an eyebolt 35 having one end attached by a hinge pin 35a to the coupling 1 and an engagement pin 34 secured to the other end portion and removably engaging an engagement slot 33a in the engagement member 33, and a split-pin cutting blade 37 attached to the eyebolt 35 for cutting a split pin 36 which maintains the eyebolt 35 in a clamped position as shown in FIG. 3 in response to the extension of the clamp cylinder 32. The clamp cylinder 32 has a port 38 connected to the pressurization ports 26, 27 of the seal pistons 24, 25 by pipes 39 such as flexible tubes coupled to a (non-illustrated) fluid pump (hydraulic pump). Therefore, the clamp cylinder 32 and the seal pistons 24, 25 are operated by the same actuator system so that they can be supplied with working fluid ML simultaneously in an emergency.

The strength of the split pin 36 or the bore of the clamp cylinder 32 is selected such that the force F2 with which the split pin 36 can be severed, the operating pressure P2 of the clamp cylinder 32, and the operating force F1 (pressure P1) of the seal pistons 24, 25 will meet the following relationships:

$$F1 < F2 \text{ or } P1 < P2 < P0$$

where P0 is a sufficiently large preset pressure applied from the fluid pressure source. By applying the pressure P0, the seal pistons 24, 25 are first slid under the operating pressure P1 to cut off the fluid flow through the fluid loading and unloading line. Then, the operating pressure P2 is applied to the clamp cylinder 32 to push the eyebolt 35 to thereby sever the split pin 36, whereupon the clamp 9 is disengaged from mating flanges 5, 6 to permit separation of the couplings 1, 2 from each other.

The operating force F1 (pressure P1) of the seal pistons 24, 25 is preset so as to overcome the frictional resistance of the seals S1, S2, S3, S4, S5, the pushing force of the slide stoppers 28, 29, and the resistance of the fluid being conveyed. The speed of sliding movement of the seal pistons 24, 25 can be controlled as desired by changing the pressure of the operating fluid ML with a suitable speed controller (not shown).

Figure 5:
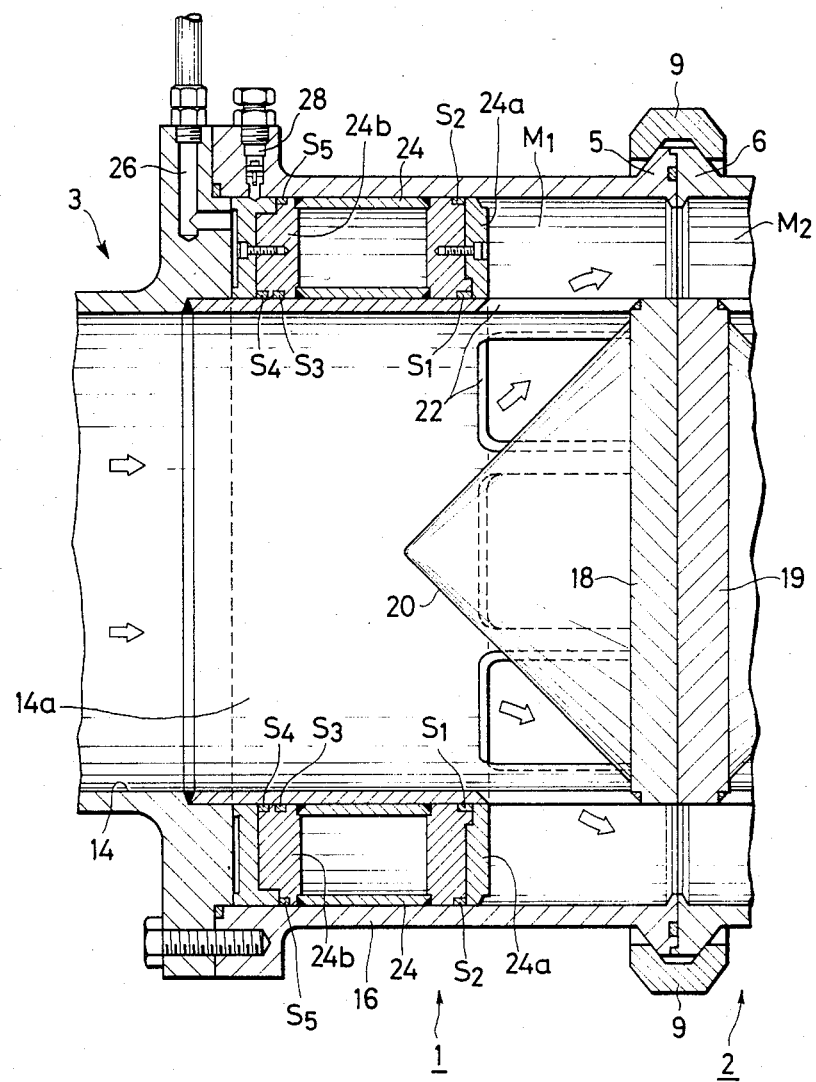
FIG. 5 is an enlarged cross-sectional view of the emergency disconnector as assembled.
Figure 6:
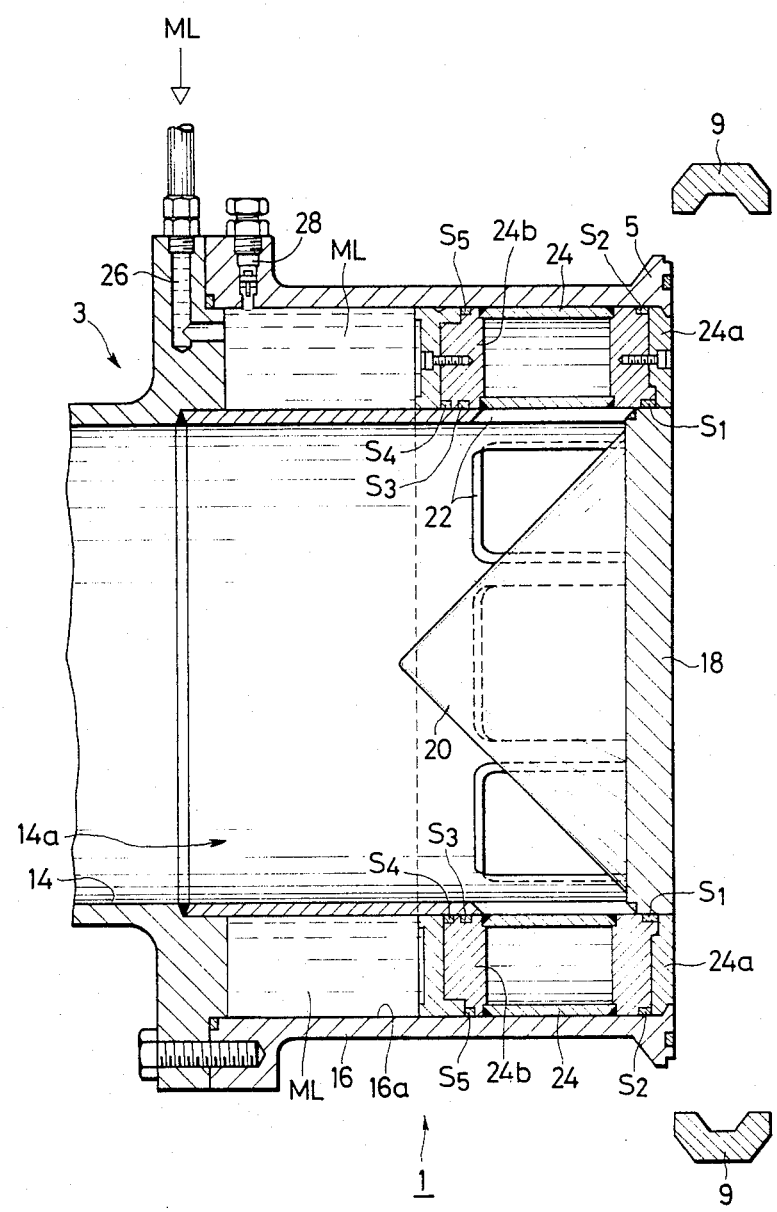
FIG. 6 is an enlarged cross-sectional view of the emergency disconnector as separated.

The operation of the emergency disconnector thus constructed is as follows:

When the mating flanges 5, 6 of the couplings 1, 2 are joined together by the clamp 9, that is, under normal conditions in which the fluid is allowed to flow through the emergency disconnector, the seal pistons 24, 25 are secured in a predetermined position by the slide stoppers 28, 29; and the closure plates 18, 19 and the stoppers 16b, 17b are respectively held in mutual abutment, as shown in FIGS. 1 and 5.

When unloading a fluid such as LNG, for example, from a tanker into a storage tank, the fluid passes through the joint pipe 10 into the fluid passage 14a in the coupling 1 in which the fluid is divided by the cone 20 to flow in the directions of the arrows into the slide space M1 through the passage openings 22. Then, the fluid is caused to flow past the stoppers 16b, 17b into the slide space M2 in the coupling 2 from which the fluid goes through the passage openings 23 into the fluid passage 15a. The fluid is then sent through the transport pipe 12 to the storage tank.

Conversely, when the fluid is to be loaded from the storage tank into the tanker, the fluid flows in directions opposite to those of the arrows. More specifically, the fluid passes from the transport pipe 12 through the fluid passage 15a and the slide space M2 in the coupling 2, the slide space M1 and the fluid passage 14a in the coupling 1 and thence through the joint pipe 10 into the tanker.

In such normal loading and unloading conditions, the seal pistons 24, 25 are retracted away from the passage openings 22, 23 and retained by the slide stoppers 28, 29, respectively. The seal pistons 24, 25 therefore do not block off the flow of fluid through the emergency disconnector, thus allowing the fluid to be transported efficiently and stably in a given direction. Any leakage of fluid being transported past the seal pistons 24, 25 is prevented by the seals S1, S2 without fail.

In an emergency situation such as when the tanker is forced off the sea berth while the fluid is being loaded or unloaded, the seal pistons 24, 25 are made to slide to cut off the flow of fluid, and thereafter the clamp is automatically released from the mating flanges 5, 6 to disconnect the couplings 1, 2. More specifically, the fluid pump applies the preset pressure P0 to the pressurization ports 26, 27 for the seal pistons 24, 25 and to the port 38 for the clamp cylinder 32, which is then actuated. Since the force F2 with which the split pin 36 can be cut off is greater than the operating force F1 of the seal pistons 24, 25, the split pin 36 remains intact and the clamp 9 remain clamped on the couplings 1, 2 until the seal pistons 24, 25 are slid into abutment against the stoppers 16b, 17b. During this time, the working fluid ML having the preset pressure P0 greater than the operating force F1 (pressure P1) is supplied to the pressurization ports 26, 27 of the seal pistons 24, 25. Therefore, the seal pistons 24, 25 are caused to slide toward the stoppers 16b, 17b, respectively, at a speed which may be determined by the slide speed controller while overcoming the frictional resistance of the seals S1–S5, the pushing force of the slide stoppers 28, 29, and the resistance of the fluid being transported. When the abutment members 24a, 25a are brought into abutting engagement with the stoppers 16b, 17b, the seal pistons 24, 25 are positioned in mutual abutment.

Since the seal pistons 24, 25 slide under the force exerted by the working fluid ML with the pressure thereof easily varied, the speed of sliding movement of the seal pistons 24, 25 can be suitably selected to control the time interval during which the flow of fluid being conveyed is cut off, thereby preventing an impact such as water hammer.

The clamp 9 still remains unreleased, and a fluid (a portion of the fluid being transported) L tends to be sealed under high pressure between the abutment members 24a, 25a located at the ends of the seal pistons 24, 25, when the abutment members are nearly in contact, as illustrated in FIG. 4. The high-pressure liquid L, however, forces the contacting projections T of the seals S1 on the seal pistons 24, 25 upwardly against the force of the springs SP. The liquid L is then squeezed out through the fluid escape gaps Q into the lower-pressure fluid that has already been cut off by the seal pistons 24, 25. External fluid leakage is thus held to an amount corresponding to the volume of gaps formed on assembly of the couplings 1, 2. When the seal pistons 24, 25 are held in abutment against the stoppers 16b, 17b, respectively, the seals S1, S3 serve to seal the fluid being conveyed, while the seals S4, S5 serve to seal the working fluid ML.

After the fluid being conveyed has thus been cut off, the clamp cylinder 32 is automatically extended under the conditions P0 > P2 > P1 to push the eyebolt 35. The force with which the clamp cylinder 32 pushes the eyebolt 35 becomes greater than the split-pin cutting force F2, and the split pin 36 is severed by the split-pin cutting blade 37. As a result, the clamp 9 is released and disengaged from the flanges 5, 6 to thereby separate the couplings 1, 2 instantaneously and automatically in a single operation.

Since the seal pistons 24, 25 and the clamp cylinder 32 are operated by the same actuating system at different operating pressures, that is, the operating pressure P1 for the seal pistons 24, 25 being smaller than the operating pressure P2 for the clamp cylinder 32, the fluid being conveyed is first cut off, and the couplings 1, 2 are then automatically separated from each other. Therefore, the fluid cutoff operation and coupling separation can be effected stepwise.

To move the seal pistons 24, 25 back to their initial positions after the emergency disconnector has been actuated, a fixture (not illustrated) may be attached to the mating flange 5 or 6 to depress the surface of the abutment member 24a or 25a over its entire periphery.

With the present invention, as described above, the seal pistons are slid in opposite directions axially of the couplings to close off the fluid flow passage. At this time, fluid sealed between the seal pistons is allowed to escape into the low-pressure fluid in the couplings. The seal pistons and the clamp cylinder are operated by the same actuator system, with the operating pressure for the seal pistons being lower than the operating pressure for the clamp cylinder. Therefore, prior to separation of the couplings, the fluid being transported is cut off within a time interval controlled so as not to produce an impact such as water hammer. Thereafter, the couplings are automatically severed from one another. External leakage of the dangerous fluid can thus be eliminated at the time of coupling separation. Accordingly, the emergency disconnector is highly reliable and safe at the time of the disconnection of the fluid loading and unloading line in an emergency.

What is claimed is:

1. An emergency disconnector for disconnecting a pair of couplings in a fluid loading and unloading line, comprising; a pair of seal pistons mounted respectively in said couplings and slidable axially of said couplings under the pressure of a working fluid, said seal pistons being movable to cut off a flow passage for the fluid, said seal pistons including means allowing a fluid, which is a portion of the fluid being transported via said line and which becomes sealed between the seal pistons when cutting off said passage, to escape into lower-pressure fluid, and for sealing the fluid being transported in the couplings, an actuator system for supplying a working fluid to said seal pistons, clamp means actuatable under the operating pressure of said fluid supplied from said actuator system, said operating pressure being higher than that of said seal pistons, and external clamp means for releasing clamps from said couplings to separate the latter from each other in response to the closing off of said couplings and said passage by said seal pistons, respectively, and the actuation of said clamp means.

2. An apparatus as claimed in claim 1 including means for supplying said working fluid to one side of each of said seal pistons under a pressure sufficient to move said pistons toward one another to cut off said passage.

3. An apparatus as claimed in claim 2 said pistons being brought into abutment at the end of the strokes thereof.

4. An apparatus as claimed in claim 1 said seal pistons comprising annular members having a plurality of sealing means in engagement therewith.

5. An apparatus as claimed in claim 4 wherein said means for allowing escape of said fluid sealed between said pistons and for sealing the fluid being transported in said couplings comprises seal means including a sealing member provided on said pistons and being movable under the pressure of said sealed fluid to allow unidirectional fluid flow thereby.

6. An apparatus as claimed in claim 5 said sealing member including a spring member and a contacting portion, the pressure of said sealed fluid moving said contacting portion against the biasing force of said spring member, to allow fluid to escape via a gap thus formed.

7. An apparatus as claimed in claim 5 said seal means further including further sealing members provided in engagement with inner and outer circumferential surfaces of said seal pistons.

8. An apparatus as claimed in claim 2 said seal pistons having an operating pressure sufficiently lower than that of said clamp means such that said seal pistons are operated to seal off said couplings prior to actuation of said clamp means.

9. An apparatus as claimed in claim 8 said clamp means comprising a cylinder receiving said working fluid under pressure, said cylinder being pressurized to urge said external clamp means to release said clamps.

10. An apparatus as claimed in claim 9 said external clamp means including release means receiving a force from said cylinder, and including shearing means for severing a shear member in response to said force, said clamps being released upon the severing of said shear member.

11. In an emergency disconnector for disconnecting two line sections of a fluid conveying line, each of said line sections being provided on their adjacent ends with an independently controllable valve for closing and with an annular flange, said line sections being maintainable in a position in which they tightly abut each other by a clamping means which grips each said annular flange of said line sections, said clamping means being releasable by separate disconnecting means, said separate disconnecting means being externally actuated without exerting any force on the line ends after said valves have been closed, the improvement wherein the line sections comprise couplings (1, 2) which are provided with fluid passages (14a, 15a), said couplings having closure plates (18, 19), positioned at one end of said couplings (1, 2) to block the fluid passages (14a, 15a), said closure plates (18, 19) abutting each other when said couplings (1, 2) are connected, said couplings including passage walls (14, 15) forming an inner periphery of said couplings (1, 2) and outer walls (16, 17), surrounding said passage walls (14, 15) and forming an outer periphery of said couplings (1, 2), said passage walls (14, 15) and said outer walls (16, 17) forming slide spaces (M1, M2) therebetween, said slide spaces (M1, M2) selectively permitting communication in the direction of fluid flow between said couplings (1, 2), said slide spaces (M1, M2) being connected to said fluid passages (14a, 15a) by means of at least one passage opening (22, 23) located in said passage walls (14, 15), said couplings (1, 2) also including seal pistons (24, 25) being axially displaceable and disposed within said slide spaces (M1, M2), said seal pistons (24, 25) having an annular shape and being actuated by a working fluid (ML) which is introduced under pressure, said seal pistons (24, 25) being selectively movable into a closed position in which fluid flow between said couplings (1, 2) is not permitted, or into an open position in which fluid flow between said couplings (1, 2) is permitted, said seal pistons (24, 25) having abutment members (24a, 25a) which are in close contact with each other and with said closure plates (18, 19) when said seal pistons (24, 25) are in the closed position.

* * * * *